United States Patent [19]

Zimmern

[11] Patent Number: 4,890,989

[45] Date of Patent: Jan. 2, 1990

[54] POSITIVE DISPLACEMENT MACHINE WITH A PLASTIC GATE PINTON

[76] Inventor: Bernard Zimmern, 6 New Street, East Norwalk, Conn. 06855

[21] Appl. No.: 154,594

[22] Filed: Feb. 11, 1988

[30] Foreign Application Priority Data

Feb. 12, 1987 [FR] France ................................ 87 01745

[51] Int. Cl.⁴ ............................ F01C 3/02; F01C 3/08; F01C 5/02; F16F 1/00
[52] U.S. Cl. ..................................... 418/153; 418/178; 418/195; 74/425; 74/439; 267/161; 267/182
[58] Field of Search ................ 418/152, 156, 178, 195, 418/153; 74/425, 439, 440, 444; 267/161, 182

[56] References Cited

U.S. PATENT DOCUMENTS

| | | | |
|---|---|---|---|
| 1,619,799 | 3/1927 | Rounds et al. | 74/440 |
| 3,959,988 | 6/1976 | McNamee | 64/15 B |
| 4,640,147 | 2/1987 | Yasukawa et al. | 74/440 |

FOREIGN PATENT DOCUMENTS

| | | |
|---|---|---|
| 901019 | 1/1954 | Fed. Rep. of Germany . |
| 1525359 | 7/1969 | Fed. Rep. of Germany . |
| 3432602 | 4/1985 | Fed. Rep. of Germany . |
| 1331998 | 6/1963 | France . |
| 1586832 | 1/1970 | France . |
| 2148677 | 3/1973 | France . |
| 2267462 | 11/1975 | France . |
| 2294322 | 7/1976 | France . |
| 2296755 | 7/1976 | France . |
| 908255 | 2/1982 | U.S.S.R. . |

*Primary Examiner*—John J. Vrablik
*Attorney, Agent, or Firm*—Young & Thompson

[57] ABSTRACT

In a positive displacement machine, a rotor has screw grooves in which pressure chambers are variably limited, at one end, by teeth of a plastic pinion which is the front element of a composite pinion meshing with the grooves. A metal backing pinion supports the plastic pinion. The metal pinion and plastic pinion are rotatable with respect to each other about the axis of rotation of the composite pinion, in conjunction with a deformation of a resilient angular coupling provided between them. This coupling is a metal blade at least partly surrounding the backing pinion shaft between the plastic pinion and the backing pinion, in a groove of the backing pinion. One end of the blade is secured to the plastic pinion, the other end of the blade is secured to the backing pinion. Several embodiments of the blade are disclosed.

10 Claims, 3 Drawing Sheets

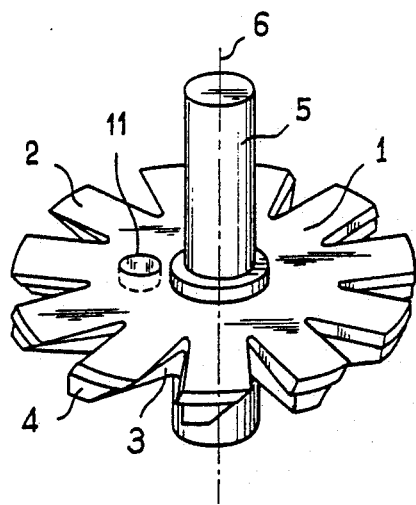
FIG_1 (PRIOR ART)
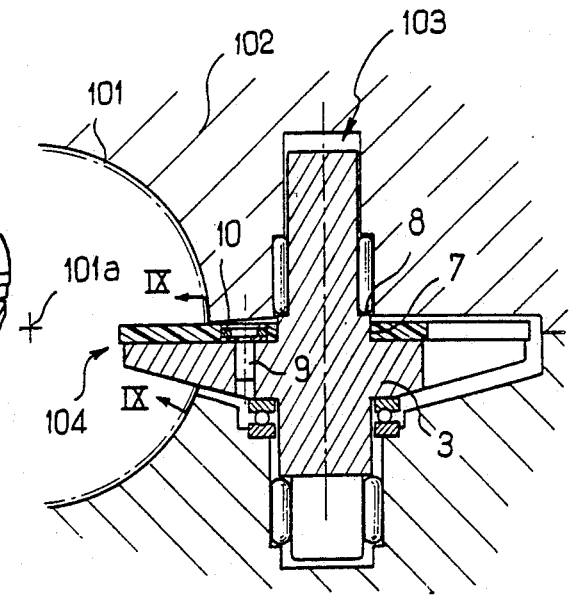
FIG_2 (PRIOR ART)
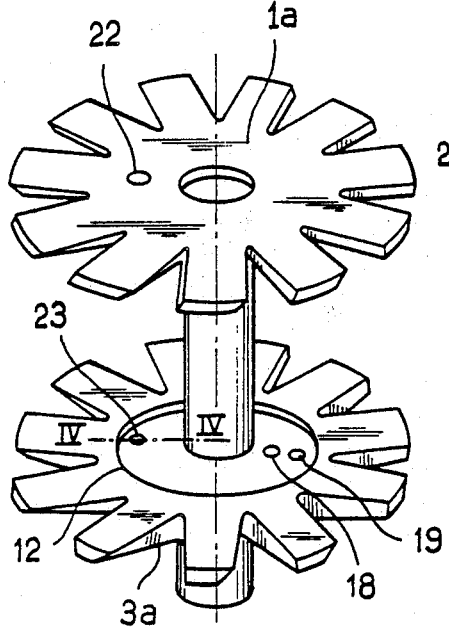
FIG_3
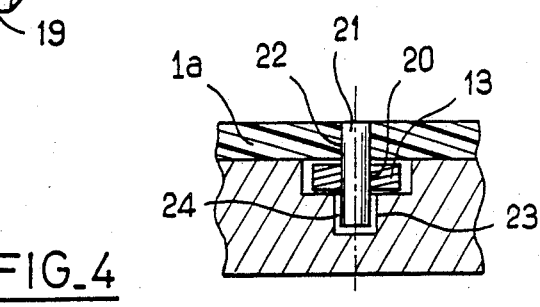
FIG_4

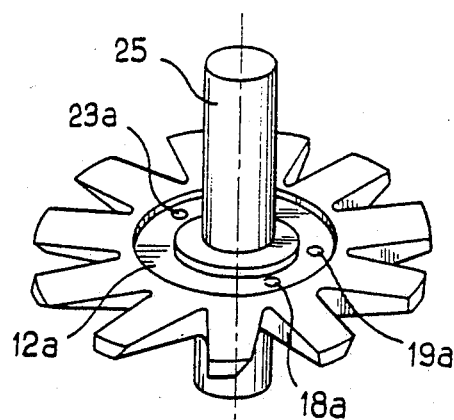
FIG. 5
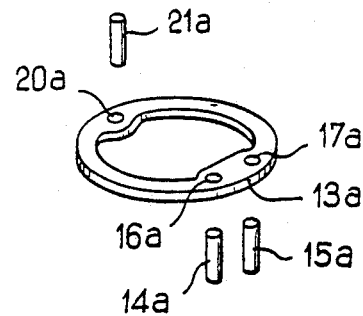
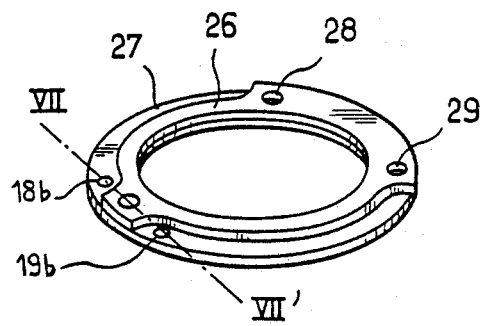
FIG. 6
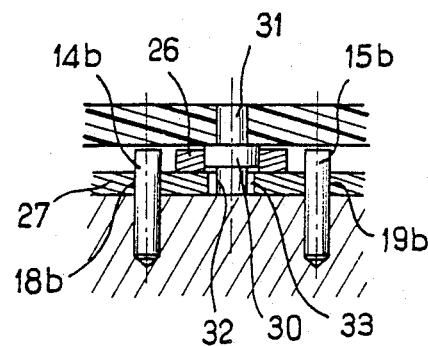
FIG. 7
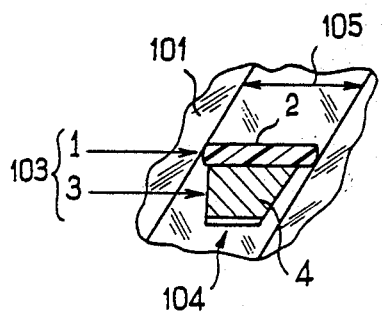
FIG. 9 (PRIOR ART)
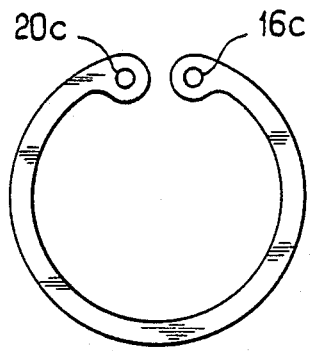
FIG. 8

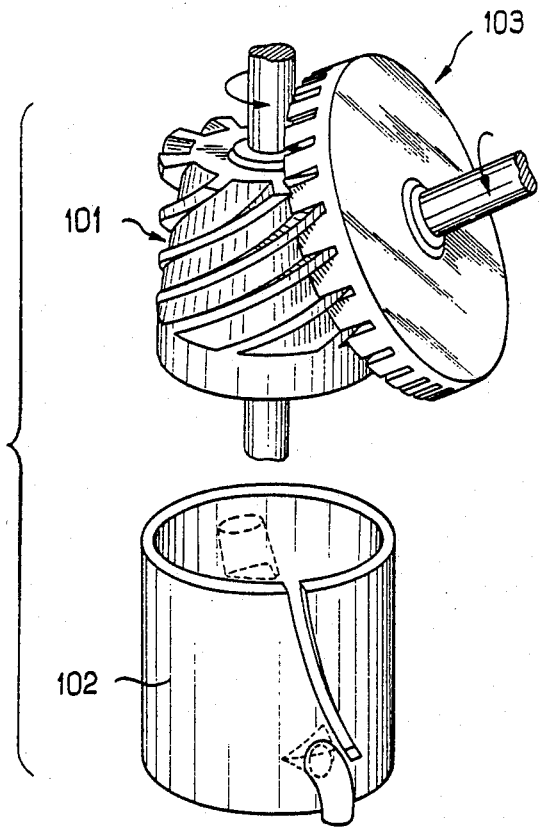
FIG_10
(PRIOR ART)
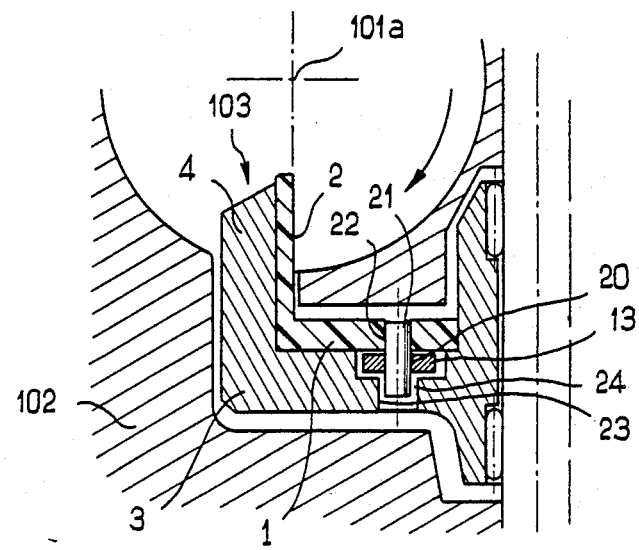
FIG_11

POSITIVE DISPLACEMENT MACHINE WITH A PLASTIC GATE PINTON

As shown in FIG. 2 of the application, compressors, pumps or expansion machines with a globoid screw are comprised of a multi-thread screw 101, rotatable about an axis 101a thereof inside a stationary casing 102 having low and high pressure orifices, and co-operating with at least one pinion 103 provided with teeth 104. Each pinion tooth 104 meshing with a thread groove 105 (FIG. 9) of the screw acts together with said groove and the inner wall of the casing for bounding a pressure chamber in part of said groove. Upon rotation of the screw and corresponding rotation of the pinion, the volume of the pressure chamber varies until, upon further rotation, the chamber registers with an exhaust orifice. According to French patent No. 2 148 677, said pinion is made of a plastic pinion facing the pressure chamber and of a metal backing member, also provided with teeth backing the plastic teeth. Only the plastic teeth are in contact with the threads of the screw.

This is the arrangement shown in FIGS. 1, 2 and 9. The pinion 103 is comprised of a plastic pinion 1 provided with teeth 2 and mounted on a metal backing pinion 3 also provided with teeth 4 and rigidly locked on a rotating shaft 5.

According to the above mentioned patent, said plastic pinion 1 is, as shown in FIG. 2 which is a section through the machine along the axis of the pinion, mounted onto the backing pinion 3 for mutual rotation about the axis 6 of rotation of the pinion. To this end, the plastic pinion 1 is provided with a bore 7 in which a central boss 8 of the metal backing pinion 3 is pivotally mounted.

This device allows the plastic pinion to rotate with respect to the backing pinion about their common axis 6.

According to French Pat. No. 2 148 677, the backing pinion is angularly connected with the plastic pinion through elastic means. More specifically, a pin 9, fixed in the backing pinion, is surrounded by an O-ring 10 accomodated into a hole 11 of the plastic pinion.

The difference in diameter between the pin 9 and the hole 11 allows for some rotation of the plastic pinion 2 with respect to the backing pinion 3 about axis 6, while the O-ring 10 biases the pin 9 back to the center of the hole 11 by elastic compression. This device has been widely used industrially and can be found in almost all single screw compressors. The object of this invention is to improve the above device, by replacing the O-ring by a spring surrounding at least in part the axis of rotation. More precisely, the object of this invention is a positive displacement machine, belonging to the group comprising compressors, pumps or expansion machines, said machine comprising a globoid screw meshing with at least one composite pinion, rotating in a stationary casing, said composite pinion being made of a plastic pinion provided with teeth meshing with the screw, one face of each tooth being in contact with the compressed fluid while said tooth travels through a thread of the screw, another face of each tooth lying against a corresponding tooth of a metal backing pinion, the plastic pinion being mounted onto the metal backing pinion for relative rotation about an axis of rotation of said composite pinion, and wherein a connection between the plastic pinion and the backing pinion is provided by a spring, arranged between the plastic pinion and the backing pinion and at least partly surrounding the axis of rotation of the composite pinion.

It has indeed been noticed, according to the invention, that a refrigeration compressor with halocarbon refrigerant and provided with a O-ring for connecting the plastic pinion and the backing pinion, and oil-injected for lubrication and cooling, as taught for instance by French patent No. 2 148 677, incurred a progressive, certainly small but nevertheless measurable drop in delivery of a few percent after some 50,000 starts, while a similar compressor having its screw, plastic pinion and backing pinion made of identical materials but provided with the spring according to the invention incurred no measurable drop in delivery whatsoever after the same number of starts, even with this compressor not being cooled by an oil injection but by an injection of liquid refrigerant, specifically R22, which as such is a very poor lubricant.

Measurements of angular acceleration during a start have then confirmed that, with a given motor, the acceleration shock and the thrust transmitted by the threads of the screw to the backing pinion via the plastic pinion were some 3 times higher in the case of the assembly with a pin and an O-ring than with the surrounding spring according to the invention; this reduction of thrust is in itself sufficient to explain why the wear has disappeared.

This invention will be better understood by reading the description hereinafter, given as a non-limiting example and the attached drawings in which:

FIG. 1 is a perspective view of a pinion substantially in accordance with French Pat. No. 2 148 677;

FIG. 2 is a schematic partial view of a machine substantially in accordance with French Pat. No. 2 148 677, in section along an axis of the pinion;

FIG. 3 is an exploded perspective view of a composite pinion according to the invention;

FIG. 4 is a part section along IV-IV' of FIG. 3;

FIG. 5 is an exploded perspective part view showing another embodiment with a connecting spring completely surrounding the axis;

FIG. 6 is a perspective view of a preferred spring;

FIG. 7 is a sectional view along VII-VII' of FIG. 6;

FIG. 8 is a plan view of a further embodiment of the spring;

FIG. 9 is a sectional view along IX—IX of FIG. 2;

FIG. 10 is an exploded perspective view of a globoid screw and pinion positive displacement machine of the prior art, having a cylindrical pinion; and FIG. 11 is a part cross section along the axis of the cylindrical pinion of a machine of the type of FIG. 10 but embodying the invention.

Referring now to FIG. 3, a connecting spring 13 is disposed in a groove 12 of a backing pinion 3a and secured to the backing pinion 3a by means of two pins 14 and 15 inserted in holes 16 and 17 provided through an end of the spring, and 18 and 19 drilled into the bottom of the groove 12.

The other end of the spring has a hole 20 in which a pin 21 is secured. Said pin 21 is also stationnarily fitted into a hole 22 provided in the plastic pinion 1a and extends into a hole 23 provided in the backing pinion 3a.

As shown in FIG. 4, while the pin 21 is inserted without play into the spring 13 and the plastic pinion 1a, it has on the other hand a play 24 with respect to the hole 23, said play defining the movement allowed for the plastic and metal pinions for their relative angular displacement about their common axis.

Preferably, the spring 13 shall be given a stiffness such that the torque required to cancel the play 24 in either direction be approximately equal to the maximum torque transmitted to the backing pinion 3a to put said backing pinion into rotation during a start of the machine or, to slow down said backing pinion when the machine is being stopped; this equality is very approximate and the damping effect of the spring is still very noticeable for stiffnesses 30 percent below or 60 percent above the theoretical one.

As an example, in a semi-hermetic compressor for the so-called "R22" refrigerant, with a screw and pinions of 140 mm outer diameter, the backing pinion has an inertia of 12,000 cgs, and if the maximum relative rotation of the plastic pinion and the backing pinion is $\pm 3.5 \times 10^{-3}$ radians, the torque provided by the spring in the extreme position is approximately 2 meter-Newton; precisely, this torque is obtained when the pinion is subjected to an acceleration of roughly 1,700 rad/$S^2$ corresponding to the compressor reaching its full speed (3,000 or 3,600 rpm) in just more than one tenth of a second.

A second embodiment of the spring is seen in FIG. 5 where the spring 13a now completely surrounds the pinion shaft 25.

The spring 13a is tightly connected to the backing pinion by two pins 14a and 15a inserted without play in the holes 16a and 17a provided in the spring and protruding with-out play in holes 18a and 19a provided in the backing pinion.

As in FIGS. 3 and 4, the spring is tightly connected to the plastic pinion, not shown, by a pin 21a inserted in a hole 20a of the spring. As in the previous embodiment, the backing pinion is provided with a hole 23a for accommodating with a predetermined play an end of pin 21a which is remote from the plastic pinion.

Obviously the arrangements of pins could be exchanged, i.e. two pins would connect the spring to the plastic pinion and one to the backing pinion without changing the invention, but the embodiment maintaining the spring angularly by two pins in the backing pinion is preferable, as the metal withstands better the shearing efforts generated by the pins 14a and 15a.

As shown in FIG. 8, the spring may extend over almost the entire periphery of the backing pinion shaft, with the anchoring points 20c, operable between one end of the spring and the plastic pinion, and 16c, operable between the other end of the spring and the backing pinion, being very near each other. A first pin is inserted without play at anchoring point 16c in the spring and in the backing pinion. A second pin inserted without play at anchoring point 20c in the spring and in the plastic pinion protrudes with a predetermined play in a hole such as hole 23a of FIG. 5 of the backing pinion. In view of its desired stiffness, the spring must be wider and thicker. This increases the cross-sectional area of the groove in the backing pinion. Therefore a spring as in FIG. 5 completely surrounding the axis of rotation is, in this respect, preferable.

It should be noticed that, as in the embodiments of FIGS. 3 and 5, the spring is housed in a groove 12a which ensures to the spring a very limited play with respect to the backing pinion or the plastic pinion in the axial direction, i.e. the direction parallel to the axis of rotation of the pinion. This results in a minimum overhang of the pins such as 14a or 15a and thus in minimum torsion stresses, especially in the plastic pinion. Such stresses could tend to create a play or even to burst the plastic.

It shall be also noticed that the radial distance between the groove and the center is smaller than the radial distance between said center and the roots of the teeth of the backing pinion. This prevents from reducing the strength of said roots and increasing the bending of the roots when loaded.

The spring surrounding the pinion axis is rather long and thus allows for substantial angular movements between the plastic pinion and the backing pinion without involving in the spring excessive stresses that would impair its lifetime.

This would not have been true, if one had, for instance, tried to set a spring around the pin to replace the O-ring and in the case of the assembly of FIG. 1.

The result of said embodiments is rather remarkable: as stated in the introductory part, a refrigeration compressor having a 140 millimeter diameter screw and pinions of the same diameter have undergone tens of thousands of starts without any wear while the compressor was cooled by an injection of the liquid refrigerant called "R22", which is a very poor lubricant; whereas the capacity of a practically identical compressor, using the same materials, cooled by an oil injection but provided with the connection device shown in FIG. 1 progressively decreased after some thousands of starts, even though the loss in capacity remained industrially acceptable. The reason of this difference is probably the following, this explanation being given as a reasonable assumption without impairing the scope of the invention.

Presumably the O-ring is overstressed due to the small compression travel and cannot retain very long its resilience; as any spring, which has been overloaded by fatigue stresses, it tends to get permanently out of shape, such phenomenon being moreover emphasized by the presence of the refrigerant which penetrates the O-ring material and reduces its mechanical properties. After a certain time of service, there is a possibility that the O-ring does not any more draw the pin toward the center of the hole.

Under such conditions, upon stopping of the compressor, the inertia of the backing pinion pushes the pin 10 towards the edge of the hole 11, the hole eventually stopping the pin.

At re-start of the machine, the plastic pinion is put in rotation by the screw and the pin then crosses all the space left free between the pin 10 and the hole, and only when it has reached the opposite edge will it begin to drive the metal backing pinion into rotation; but as that time, the plastic pinion has already reached a certain angular speed while the backing pinion is still stopped and the speeding up of the backing pinion occurs on a zero distance and thus introduces a heavy shock.

On the contrary, with the spring according to the invention, the backing pinion is progressively accelerated while the plastic pinion leaves its central position and one can, by adopting a convenient value for the spring, make the angular speeds equal at the moment when the plastic pinion and the backing pinion just come to contact.

FIGS. 6 and 7 show a preferential embodiment of the spring in which the latter, rather than being made of a single blade is built with two super imposed annular blades 26 and 27, welded for instance by the spots 28 and 29.

The blade 27 has two holes 18b and 19b into which the pins 14b, 15b are inserted. Pins 14b and 15b are anchored in corresponding holes of the backing pinion.

The blade 26 carries without play a pin 30 having one end 31 which is set without play into the plastic pinion and the other end 32 which can move within a hole 33 provided in the blade 27, the end 32 and the hole 33 thus forming a stop limiting the angular movement.

The interest of this embodiment is practical; contrary to FIG. 5, it avoids the need of an accurate angular positioning of the various holes around the axis of the pinion, because the spring carries its stop itself.

This invention has been shown in the case of a compressor with a plane pinion, but it would apply without modification to the case of compressors with cylindrical pinions as described in French patent No. 1 586 832.

FIG. 10 shows such a machine having a globoid screw 101 rotatable within a casing 102 and meshing with a pinion 103 provided with teeth disposed in a cylindrical pattern.

FIG. 11 shows how an arrangement such as that of FIG. 4 may be incorporated in the machine of FIG. 10. Reference numerals corresponding to those of FIG. 4 are used.

Another advantage of this invention is that the diameter of the hole to be made in the plastic pinion to ensure the connection with the spring is much smaller than the one necessary in the embodiment of FIG. 1; and this increases considerably the shock resistance of the plastic pinion, for instance in the case of a "liquid slug" in refrigeration machines.

I claim:

1. A positive displacement machine, belonging to the group comprising compressors, pumps or expansion machines, said machine comprising a globoid screw meshing with at least one composite pinion rotatably mounted in a stationary casing, said composite pinion comprising a plastic pinion provided with sealing teeth sealingly meshing with the screw, and a metal backing pinion provided with backing teeth against which a back face of the sealing teeth lies, the plastic pinion being mounted on the metal backing pinion for relative rotation about an axis of rotation of said composite pinion, wherein a connection between the plastic pinion and the backing pinion is provided by a spring, arranged between the plastic pinion and the backing pinion and at least partly surrounding the axis of the composite pinion, and wherein:

the spring is connected to the plastic pinion by first connecting means and to the backing pinion by second connecting means;

stop means which are fixedly secured to the backing pinion limit angular travel of the first connecting means with respect to the backing pinion to a predetermined angular stroke;

when the spring is at rest, the first connecting means are substantially at half-way of said predetermined angular stroke;

the stiffness of the spring is such that the torque to be applied to the plastic pinion with respect to the backing pinion for abutting the first connecting means against the stop means is about 70 to 160% of the maximum torque needed to accelerate and decelerate the backing pinion at start up of the machine and respectively during stopping of the machine.

2. A positive displacement machine according to claim 1, wherein the first connecting means is a pin and the stop means are provided by opposed ends of a hole in the backing pinion.

3. A positive displacement machine according to claim 1 wherein the spring surrounds completely the axis of rotation of the composite pinion.

4. A positive displacement machine according to claim 3 wherein the spring is made of two blades welded at a first angular section and wherein a first of said blades is connected with the plastic pinion by said first connecting means and a second said blade is connected with the metal backing pinion by said second connecting means and wherein said first and second connecting means are located generally adjacent to each other at a second angular section generally diametrically opposite to said first section, with respect to the axis of rotation.

5. A positive displacement machine according to claim 4, wherein said stop means are carried by the second blade and are operable for limiting relative angular movement between the two blades adjacent the second angular section.

6. A positive displacement machine according to claim 4, wherein said stop means are opposed ends of a hole provided in said second blade and accommodating with play a pin connecting said first blade to the plastic pinion.

7. A positive displacement machine, belonging to the group comprising compressors, pumps or expansion machines, said machine comprising a globoid screw meshing with at least one composite pinion rotatably mounted in a stationary casing, said composite pinion comprising a plastic pinion provided with sealing teeth sealingly meshing with the screw, and a metal backing pinion provided with backing teeth against which a back face of the sealing teeth lies, the plastic pinion being mounted on the metal backing pinion for relative rotation about an axis of rotation of said composite pinion, wherein a connection between the plastic pinion and the backing pinion is provided by a spring, arranged between the plastic pinion and the backing pinion and completely surrounding the axis of the composite pinion, wherein the spring is made of two blades welded together about a first angular section and wherein a first of said blades is connected with the plastic pinion by first connecting means and a second said blade is connected with the metal backing pinion by second connecting means and wherein said first and second connecting means are located generally adjacent to each other about a second angular section generally diametrically opposite to said first section, with respect to the axis of rotation.

8. A positive displacement machine according to claim 7, wherein one of the first and second blades carries stop means limiting travel of said connecting means connected to the other of said first and second blades.

9. A positive displacement machine according to claim 7, wherein stop means carried by one of the blades are operable for limiting relative angular movement between the two blades adjacent the second angular section.

10. A positive displacement machine according to claim 7 wherein the relative rotation of the plastic pinion with respect to the backing pinion is limited by stop means and wherein when the plastic pinion and the backing pinion are in a position of abutment by the stop means, the torque generated by the spring is generally equal to the highest torque needed by the backing pinion to come into rotation during a start of the positive displacement machine and respectively to stop rotating when the machine is being stopped.

* * * * *